United States Patent [19]
Luthi et al.

[11] 3,772,144
[45] Nov. 13, 1973

[54] APPARATUS AND METHOD FOR THICKENING AND WASHING SUSPENSIONS CONTAINING FIBROUS MATERIAL

[75] Inventors: Oscar Luthi, Nashua; Lawrence A. Carlsmith, Amherst, both of N.H.

[73] Assignee: Improved Machinery Inc., Nashua, N.H.

[22] Filed: May 15, 1972

[21] Appl. No.: 253,198

Related U.S. Application Data

[63] Continuation-in-part of Ser. No. 133,958, April 14, 1972, abandoned.

[52] U.S. Cl............ 162/210, 100/90, 100/121, 100/156, 162/302, 162/314, 162/329, 210/326, 210/386
[51] Int. Cl....... D21d 5/02, D21f 1/60, B01d 33/06
[58] Field of Search.............. 162/208, 308, 210, 162/329, 324, 321, 328, 347, 388, 212, 302, 162/390, 314; 100/90, 121, 156, 177; 210/326, 386

[56] References Cited
UNITED STATES PATENTS

| | | | |
|---|---|---|---|
| 3,419,466 | 12/1968 | Sepall | 162/204 |
| 2,528,189 | 10/1950 | Temperley | 162/328 X |
| 3,645,843 | 2/1972 | Schmaeng | 162/347 |
| 3,263,598 | 8/1966 | Sylla | 162/302 X |
| 2,963,158 | 12/1960 | Jung | 210/386 X |

FOREIGN PATENTS OR APPLICATIONS

| | | | |
|---|---|---|---|
| 1,095,294 | 5/1955 | France | 162/329 |
| 173,903 | 1/1961 | Sweden | 162/329 |

Primary Examiner—S. Leon Bashore
Assistant Examiner—Richard H. Tushin
Attorney—David W. Tibbott et al.

[57] ABSTRACT

Apparatus comprising at least one rotatably driven drum having a circumferential filter medium adjacent which pressurized liquid suspension containing fibrous material is supplied in the rotary direction of the drum driven rotation. One or more baffles, having low friction material on their surfaces opposing the filter medium, are resiliently biased by pressurized liquid and/or mechanical biasing means to gradually converge towards the filter medium in the rotary direction of the drum driven rotation, and fibrous material collected on the filter medium may be washed by either the biasing liquid or separately supplied pressurized liquid. Also, a method for processing a suspension containing fibrous material through the employment of such an apparatus.

46 Claims, 11 Drawing Figures

Patented Nov. 13, 1973

INVENTORS
OSCAR LUTHI
LAWRENCE A. CARLSMITH

BY
Robert R. Paquin
ATTORNEY

INVENTORS
OSCAR LUTHI
LAWRENCE A. CARLSMITH

BY
Robert R. Paquin

ATTORNEY

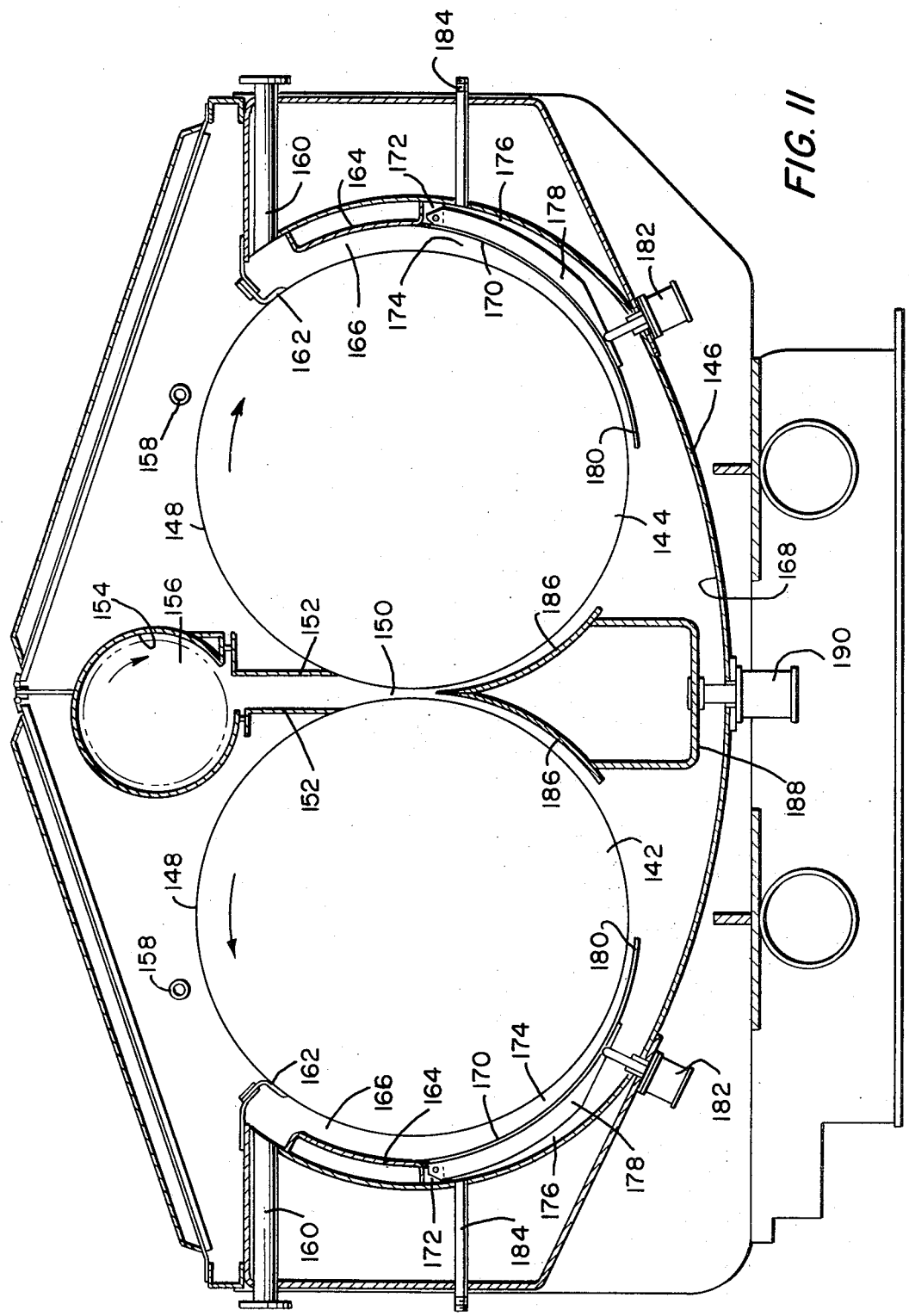

APPARATUS AND METHOD FOR THICKENING AND WASHING SUSPENSIONS CONTAINING FIBROUS MATERIAL

This is a continuation-in-part of U. S. Pat. Application Ser. No. 133,958, filed Apr. 14, 1971, now abandoned.

The present invention relates to apparatus and methods for processing suspensions containing fibrous material, such as for example pulp slurries and sludges, through the employment of a rotatably driven drum having a circumferential filter medium.

During the processing of a liquid suspension containing fibrous material, such as for example a pulp slurry, frequently the suspension must be thickened and/or the fibrous material must be washed. Conventionally, these thickening and washing operations generally have been accomplished on conventional rotary drum vacuum filtering apparatus. However, such conventional apparatus is normally limited to processing dilute suspensions of fibrous material (i.e., suspensions of only about 1 to 1½ percent consistency), thus requiring that an extremely large volume of liquid be supplied with the fibrous material and necessitating large expensive pumping equipment for pumping the suspension. Also, as in such conventional apparatus the operating vacuum is normally created by a barometric leg, the apparatus usually must be substantially elevated. This requirement for elevation of the apparatus makes necessary the provision of relatively expensive supporting structures and, of course, compounds the problems created by the large volume of liquid which must be supplied with the fibrous material.

An object of the present invention is to provide a new and improved apparatus particularly constructed and arranged for washing, thickening and/or otherwise processing a suspension containing fibrous material such as, for example, a pulp slurry or a sludge.

Another object of the invention is to provide a new and improved apparatus of the type set forth particularly constructed and arranged to be fed with a suspension of consistency greater than normally possible with such prior conventional apparatus.

Another object is to provide a new and improved apparatus of the type set forth particularly constructed and arranged to avoid the necessity for a vacuum or sub-atmospheric pressure.

Another object is to provide a new and improved apparatus of the type set forth particularly constructed and arranged to discharge fibrous material at greater consistency than normally possible with the aforesaid prior conventional apparatus.

Another object is to provide a new and improved apparatus of the type set forth particularly constructed and arranged to provide a better formation of the collected fibrous material than normally possible with the aforesaid prior conventional apparatus when fed with suspension at relatively high consistency.

Another object is to provide a new and improved apparatus of the type set forth particularly constructed and arranged to provide pressing of a mat of fibrous material without disruption of the mat.

Another object is to provide a new and improved apparatus of the type set forth particularly constructed and arranged to process a suspension without exposure of the suspension to air.

Another object is to provide a new and improved method particularly adapted for washing, thickening and/or otherwise processing a suspension containing fibrous material such as, for example, a pulp slurry or a sludge.

Another object is to provide a new and improved method of the type set forth particularly adapted for the processing of a suspension of relatively high consistency.

Another object is to provide a new and improved method of the type set forth particularly adapted for discharging fibrous material at relatively high consistency.

Other objects and advantages of the invention will be apparent from the following description taken in connection with the accompanying drawings wherein the preferred forms of the invention have been given by way of illustration only.

In accordance with the invention, an apparatus for processing a suspension containing fibrous material may comprise at least one drum adapted to be rotatably driven in a predetermined rotary direction and having a circumferential porous filter medium for collecting fibrous material, discharge means for removing collected fibrous material from said filter medium, a pressing baffle extending along one side of said filter medium for a substantial portion of the drum circumference and spaced around said drum from said discharge means, said pressing baffle having a leading end leading in said predetermined rotary direction and a trailing end trailing in said predetermined rotary direction, said pressing baffle having a face opposing said one side of said filter medium spaced therefrom to bound a space arcuately along said one side of said filter medium for a substantial portion of the drum circumference, said pressing baffle being pivotally mounted adjacent its said leading end for movement towards-and-away from said filter medium and said pressing baffle including a substantial portion adjacent its said leading end restrained from flexing, said pressing baffle being adapted to gradually converge towards said one side of said filter medium in said predetermined rotary direction such that said space gradually narrows in said predetermined rotary direction for causing substantial liquid flow from said space through said filter medium, means for causing said pressing baffle to be resiliently biased to so gradually converge towards said filter medium in said predetermined rotary direction, means for supplying pressurized washing fluid to said one side of said filter medium following said trailing end of said pressing baffle and before said discharge means in said predetermined rotary direction whereby, during an arcuate portion of the drum rotation intermediate said baffle trailing end and said discharge means, fibrous material collected on said filter medium is washed by such washing fluid, and inlet means for supplying pressurized suspension containing fibrous material to said one side of said filter medium, said inlet means and said discharge means being operatively associated with said filter medium on opposite sides of said pressing baffle in said predetermined rotary direction.

Also, in accordance with the invention, a suspension containing fibrous material may be processed on a filter medium circumferentially carried by a drum rotatably driven in a predetermined rotary direction, by a method which may comprise the steps of providing along one side of said filter medium space gradually narrowing in said predetermined rotary direction for a substantial portion of the drum circumference and bounded by a pressing baffle which is resiliently biased to gradually converge towards said one side of said filter medium for a substantial portion of the drum circumference to cause substantial liquid flow from said space through said filter medium, supplying the suspension to said one side of said filter medium prior to the end of said baffle leading in said predetermined rotary direction, causing the supplied suspension to pass along said one side of said filter medium in said predetermined rotary direction whereby liquid may flow from the suspension through said filter medium, washing the fibrous material collected on said filter medium with pressurized fluid after the end of said baffle trailing in said predetermined rotary direction, and removing the washed fibrous material from said filter medium.

Referring to the drawings:

FIG. 11 is an elevational sectional view of another apparatus embodying the invention.

Figure 1:
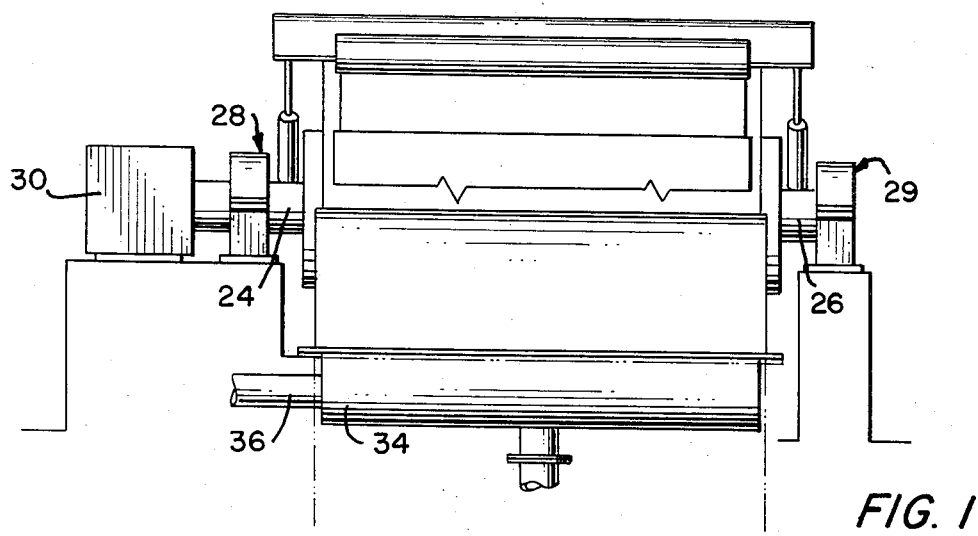
FIG. 1 is an elevational side view of one apparatus embodying the invention.
Figure 4:
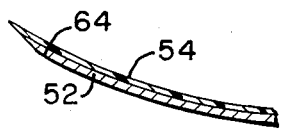
FIG. 4 is an enlarged fragmentary sectional view of one of the baffles of the apparatus shown in FIG. 1.
Figure 2:
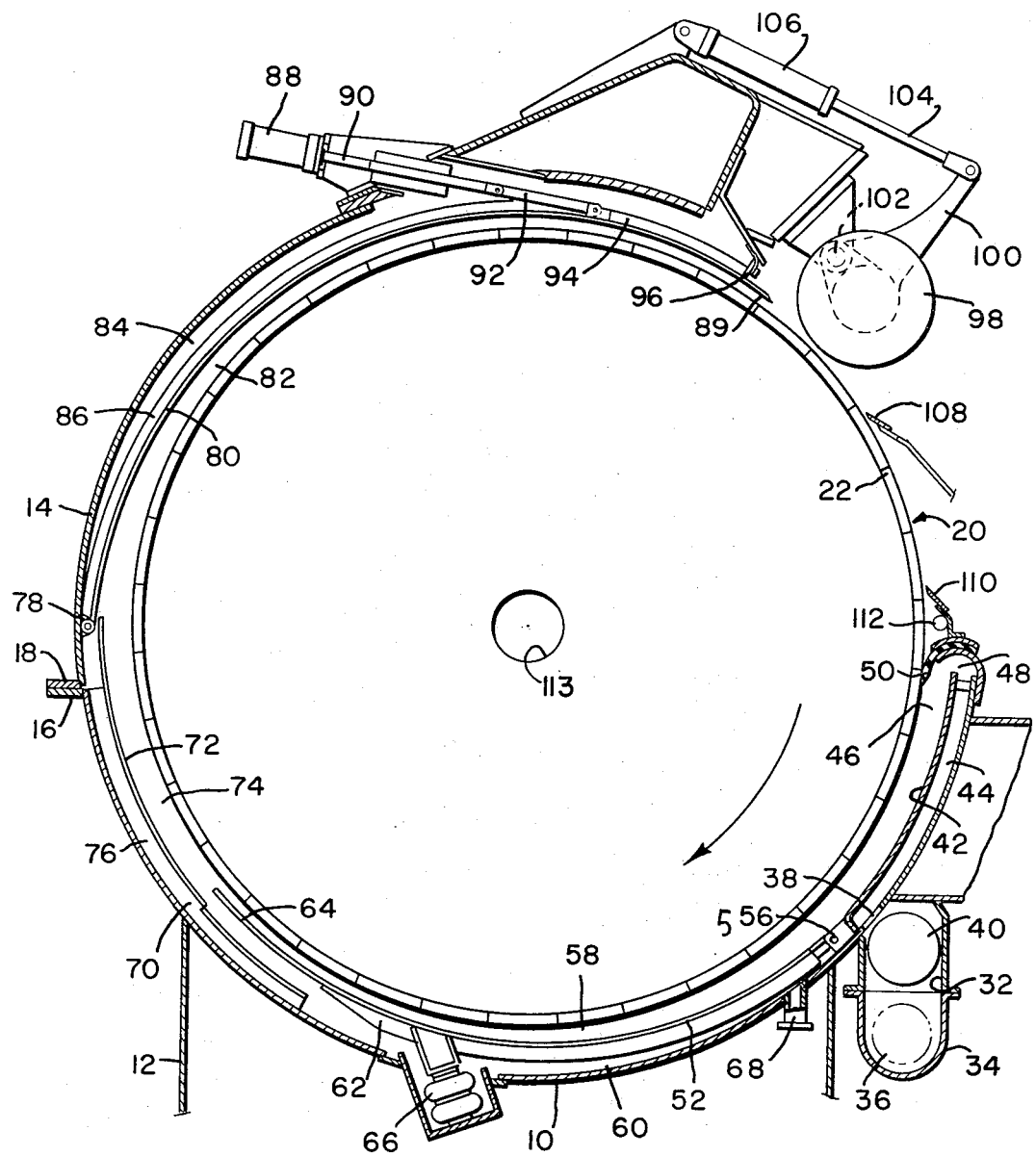
FIG. 2 is an enlarged elevational sectional view of the apparatus shown in FIG. 1.

Referring more particularly to the drawings wherein similar reference characters designate corresponding parts throughout the several views, FIGS. 1 and 2 illustrate an embodiment of the invention in the form of an apparatus particularly constructed and arranged for washing fibrous material in a liquid suspension. The illustrated washing apparatus comprises an arcuate tank or vat which is arranged on a horizontal axis and formed of split construction to include an arcuate lower vat wall element 10, mounted on a base or foundation 12, and an arcuate upper vat wall element 14 welded or otherwise affixed to the lower wall element 10 along their mating flanges 16, 18. The opposite ends of the vat are closed by generally vertical vat end wall elements connected to the upper and lower wall elements 10, 14 to form the vat of liquid tight construction.

The washing apparatus further comprises a generally annular drum, designated generally as 20, which is rotatably disposed in the vat on a horizontal axis and spaced from the wall elements 10, 14 which surround the drum 20 for the major portion of its circumference. The drum 20 carries a circumferential, porous filter medium 22 which may be, per se, of any suitable conventional construction. The opposite ends of the drum 20 are supported by stub shafts 24, 26 rotatably mounted on bearings designated generally as 28 and 29, the shaft 24 being connected to a rotary drive motor 30 which throughout the operation of the apparatus rotatably drives the drum 20 in the clockwise direction, as viewed in FIG. 2. As will be understood, all hereinafter described rotary directions are given with refernece to the drum 20 as viewed in FIG. 2; and the terms leading and trailing are hereinafter employed with regard to the rotary direction of the drum driven rotation.

The apparatus is provided with an inlet comprising a feed chamber 32 contained within an inlet housing 34 depending from the lower vat wall element 10, the housing 34 and its contained feed chamber 32 extending the length of the vat. A supply pipe 36, communicating with a pressurized source of a liquid suspension containing fibrous material, is connected to one end of the feed chamber 32 and the latter gradually tapers in cross-section as it longitudinally extends from its connection to to supply pipe 36. The feed chamber 32 throughout its length communicates with the interior of the vat through elongated feed openings 38 formed in the lower vat wall element 10; and a rotor 40, having circumferential paddles or other means adapted to wipe the inlet opening 38, is located in the feed chamber 32 adjacent to the inlet openings 38 to prevent any possibility of clogging of the inlet openings 38.

An imperforate baffle 42 mounted internally of the vat includes an arcuate portion spaced between the outer circumference of the drum carried filter medium 22 and the wall element 10 to bound the inner periphery of an arcuate inlet chamber 44 which extends along the inner periphery of the wall element 10 throughout the length of the vat and communicates through the inlet openings 38 with the feed chamber 32. The opposite sides of the baffle 42 are affixed to the vat end walls; and the trailing end of the baffle 42 is rigidly mounted on the wall element 10 to prevent flow from the inlet chamber 44 along the wall element 10 in the clockwise direction of the drum driven rotation. The leading end of the baffle 42 is spaced from the adjacent end of the wall element 10 by a feed space 48 to permit flow from the inlet chamber 44 around such end of the baffle 42 to the arcuate space 46 between the baffle 42 and the outer circumference of the filter medium 22; and such end of the wall element 10 carries a resilient sealing strip 50 engaging the filter medium 22 throughout the length of the drum 20. As will be seen, the aforedescribed inlet arrangement introduces pressurized suspension containing fibrous material to the outer surface of the filter medium 22 at the space 48 in the clockwise rotary direction of the drum driven rotation.

Figure 3:
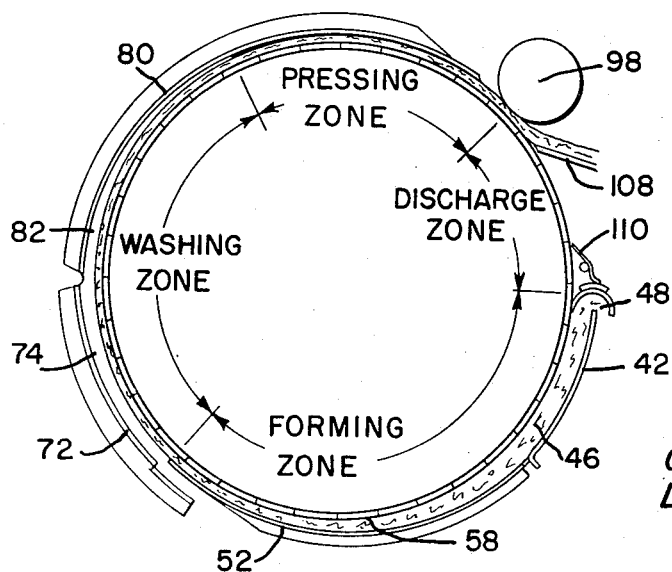
FIG. 3 is a diagrammatic view illustrating the operating cycle of the apparatus shown in FIGS. 1 and 2.

An imperforate, first pressing baffle 52, transversely the full length of the filter medium 22, arcuately extends along the outer circumference of the filter medium 22 following the trailing end of the baffle 42. The baffle 52 is preferably of an arcuate length greater than about 60° and less than about 120° of the drum circumference; and the total of the arcuate lengths of the baffles 42, 52 is preferably greater than about 100° and less than about 180° of the drum circumference. The baffle 52 is pivotally mounted at its leading end for movement towards-and-away from the filter medium 22 on a mounting block 56 carried by the wall element 10; and throughout its length the baffle 52 divides the arcuate space between the filter medium 22 and the vat wall element 10 into inner and outer arcuate chambers 58, 60, respectively. The inner arcuate chamber 58 is open to communicate with the space 48 and is defined along its inner circumference by the filter medium 22 and along its outer circumference by the inner side face of the baffle 52. The outer or biasing chamber 60 is bounded along its outer circumference by the wall element 10 and along its inner circumference is defined by the outer side face of the baffle 52. The outer side face of the baffel 52 rigidly carries a plurality of laterally spaced, reinforcing rib elements 62 which extend throughout the major portion of the arcuate length of the baffle 52 but terminate short of the trailing end thereof whereby the trailing end portion 64 of the baffle 52 is freely flexible. The inner side face of the baffle 52 is, as shown in FIGS. 2 and 3, generally concave and, at least adjacent the trailing end of the baffle 52, is provided with a coating 54 of a low-coefficient of friction material such as, for example, polytetrafluoroethylene or TFE. The opposite sides of the baffle 52 are slightly spaced from the vat end walls; and suitable resilient sealing means (not shown) are provided between each of such sides and the thereadjacent vat end wall to prevent communication of the chambers 58, 60 around the sides of the baffle 52.

A plurality of pressure fluid operated actuators 66 are connected to the baffle 52 at locations laterally spaced thereacross adjacent the baffle trailing end for urging the baffle 52 towards the filter medium 22. The actuators 66, could, if desired, be employed to resiliently bias the baffle 52 towards the filter medium 22 throughout the operation of the apparatus, but in the embodiment of the invention shown in FIGS. 1 and 2 are intended only for initially raising the baffle 52 towards the filter medium 22 following each start-up of the apparatus. Adjacent the leading end of the baffle 52, the wall element 10 is provided with an integral inlet connection 68 which during the operation of the apparatus is connected to receive pressurized liquid such as water. The pressurized liquid supplied to the chamber 60 through the inlet connection 68 is, in the FIGS. 1 and 2 embodiment of the invention, employed as the means for resiliently biasing the baffle 52 towards the filter medium 22 whereby the baffle 52 gradually converges towards the filter medium 22 in the clockwise direction of the drum driven rotation.

A plurality of arcuate rib elements 70 are mounted on the inner periphery of the vat wall element 10 laterally spaced along the vat with their leading ends beneath the freely flexible trailing end portion 64 of th baffle 52. An arcuate baffle 72, transversely the length of the vat, is mounted on the rib elements 70 spaced from the filter medium 22 by an arcuate washing chamber 74 and spaced from the wall element 10 by the arcuate chambers 76 between the adjacent ones of the rib elements 70. The leading end of the baffle 72 is slightly spaced from the trailing end of the baffle 52 when the end portion 64 of the latter is on the rib elements 70; the trailing end of the baffle 72 extends in advance of the trailing ends of the rib elements 70. The chambers 74, 76, as will be seen from FIG. 2, are open to communication with the chamber 60 and hence during the operation of the apparatus receive the pressurized liquid from the latter.

A mounting block 78 is affixed to the inner periphery of the wall element 14 outwardly of the trailing end of the baffle 72. An imperforate, second pressing baffle 80, transversely the full length of the filter medium 22, is pivotally mounted at its leading end of the mounting block 78 for movement towards-and-away from the filter medium 22 and arcuately extends along the outer circumference of the filter medium following the trailing end of the baffle 72. Throughout its length the baffle 80 divides the arcuate space between the filter medium 22 and the vat wall element 14 into inner and outer arcuate chambers 82, 84, respectively. The inner arcuate washing chamber 82 is open to communication with the chamber 74 and is bounded along its inner circumference by the filter medium 22 and along its outer circumference by the inner side face of the baffle 80. The outer or biasing arcuate chamber 84 communicates with the chambers 76 and is defined along its outer circumference by the wall element 14 and along its inner circumference by the outer side face of the baffle 80. The outer side face of the baffle 80 rigidly carries a plurality of laterally spaced, reinforcing rib elements 86 which extend throughout the major portion of the arcuate length of the baffle 80 but terminate short of the trailing end of the baffle 80 to cause its trailing end portion 89 to be freely flexible. The arcuate construction of the baffle 80 is such that, during the operation of the apparatus, the inner side face of the baffle 80 engages collected fibrous material carried by the filter medium 22 for an arcuate distance at the minimum about thirty degrees of the drum circumference; and the inner side face of the baffle 80 is, as shown in FIGS. 2 and 3, generally concave and throughout at least such 30° are provided with a coating of a low-coefficient of friction material, such as for example polytetrafluoroethylene or TEE, similar to that on the baffle 52.

A plurality of pressure fluid operated actuators 88 are mounted on the vat wall element 14 laterally spaced across the baffle 80. The pistons of the actuators 88 are connected to extension rods 90 each, in turn, pivotally connected to one end of a link rod 92 at its other end pivotally connected to an element 94 affixed on the outer side face of the baffle 80 adjacent the trailing end thereof. A resilient sealing element 96 is mounted on the trailing end of the element 94 for sealing the forward end of the outer chamber 84.

A press roll 98 is provided adjacent the outer circumference of the filter medium 22 closely spaced after the trailing end of the baffle 80. The press roll 98 extends the full length of the filter medium 22 and is rotatably mounted on a pair of arms 100 each mounted by a pivotal connection 102 to the vat. Each arm 100 is pivotally connected to one end of an extension rod 104 at its other end connected to the piston of a pressure fluid operated actuator 106 whereby the actuators 106 are operable to move the press roll 98 toward-and-away from the filter medium 22 and resiliently bias the press roll 98 towards the latter.

A first or upper doctor blade 108, mounted closely spaced after the trailing side of the press roll 98, is closely spaced from the outer circumference of the filter medium 22 for removing the mat of collected fibrous material from the latter. A second or lower doctor blade 110 is mounted closely spaced from the outer circumference of the filter medium 22 intermediate the first doctor blade 108 and the sealing element 50; and a washing shower, designated generally as 112 and connected to a pressurized source of water or other washing liquid, is positioned intermediate the second doctor blade 110 and the sealing element 50 for washing the filter medium 22 adjacent it location. The liquid internally of the filter medium 22 is discharged to a tank or rservoir at atmospheric pressure through a liquid discharge outlet 113 which may, as illustrated, be formed through the shaft 26.

Throughout the operation of the aforedescribed apparatus, the drum 20 is continuously rotatably driven by the motor 30 in the clockwise direction schematically depicted by the arrow shown internally of the drum 20 in FIG. 2. Pressurized water or other liquid is supplied to he chamber 60 through the inlet connection 68 to resiliently bias the pressing baffle 52, initially elevated towards the filter medium 22 by the actuators 66, to gradually converge towards the filter medium 22 in the clockwise direction of the drum driven rotation, as shown in FIG. 2. Hence, the arcuate chamber 58 intermediate the baffle 52 and the filter medium 22 is resultantly caused to gradually narrow in cross section as it extends along the filter medium 22; and the chambers 74, 76, 82, 84 are supplied with pressurized liquid from the chamber 60.

Pressurized liquid suspension containing fibrous material is continuously supplied by the supply pipe 36 to the feed chamber 32 and flows from the latter through the inlet openings 38, chamber 44 and space 48 to the space 46 where it is introduced to the filter medium 22 in the clockwise direction of the drum driven rotation. This pressurized suspension may be of two to four per cent consistency in the instance of long fibered Kraft pulp or of 2 to 6 percent consistency in the instance of hardwood Kraft pulp.

During the passage of the pressurized suspension through the space 46, the pressure of the suspension causes liquid therein to flow inwardly through the filter medium 22 whereby a mat or covering of fibrous material begins to collect on the filter medium 22. As the pressurized suspension continues along the filter medium 22, it passes into the chamber 58 whereupon the gradual narrowing of the chamber 58 causes substantial additional liquid to flow from the liquid suspension through the filter medium 22. Hence, fibrous material is collected on the filter medium 22 throughout the arcuate forming zone defined by the baffles 42, 52 and schematically depicted in FIG. 3; and a high consistency mat of fibrous material is formed on the filter medium 22 in this forming zone.

As the drum rotation causes the collected high consistency mat to be rotated beyond the trailing end of the baffles 52, the mat becomes exposed to the pressurized liquid in the chambers 74, 82 whereupon such pressurized liquid flows inwardly through the mat and the filter medium 22 to, throughout the arcuate washing zone schematically depicted in FIG. 3, provide washing of the collected mat. The baffle 80, fluid biased by the pressurized liquid in the chamber 84 to gradually converge towards the filter medium 22 in the clockwise direction of the drum driven rotation, engages the washed mat of fibrous material throughout at least thirty degrees of the drum circumference to compact the mat and press liquid from the latter. The pressurized washing liquid in the chamber 82 prevents liquid pressed from the mat by the baffle 80 from flowing backwardly in the counter-clockwise direction through the chamber 82, thereby preventing the disruption of the mat which would occur in the event of such backward flow and avoiding slipping of the mat on the filter medium. As a result, friction between the mat and the baffle 80 is minimized and the formation of voids in the mat is prevented. The actuators 88 are continuously fluid operated to restrain movement of the baffle 80 towards the filter medium 22 and assist the pressurized liquid in the chamber 82 in insuring that the pressing action of the baffle 80 does not cause backward flow of the pressed liquid through the chamber 82. Hence, all of the liquid pressed from the mat by the baffle 80 flows through the filter medium 22 internally of the drum 20.

The press roll 98, located closely after the trailing end of the baffle 80, presses from the mat of fibrous material additional liquid which flows inwardly through the filter medium 22 and, together with the other liquid flowing into the drum 20, is discharged through the discharge outlet 113. It has been found that the combination of the gradually converging baffle 80 and the substantially immediately following press roll 98 results in a pressed fibrous material mat of substantially greater consistency than normally possible and avoids the highly undesirable "crushing" of the fibrous material and counter-clockwise or reverse flow of the pressed out liquids which would inherently result in the event that it was attempted to provide a mat of similar consistency through only a single pressing. For example, in the event that the supplied pressuized suspension is of four per cent consistency, the fibrous material mat provided after the press roll 98 could typically be of 30 percent consistency.

The fibrous material mat, after it pressing by the press roll 98, is discharged from the filter medium 22 by the upper doctor blade 108; and any thereafter remaining fibrous material is subsequently removed by the lower doctor blade 110. In the event of blockage of any of the arcuate chambers along the filter medium 22, such blockage can readily be cleared by moving the baffles 52, 80 and press roll 98 away from the filter medium to thereby provide a continuous, substantially constant cross section passage arcuately around the filter medium 22, and then causing the blocking material to be driven through such passage by supplied pressurized suspension.

Figure 5:
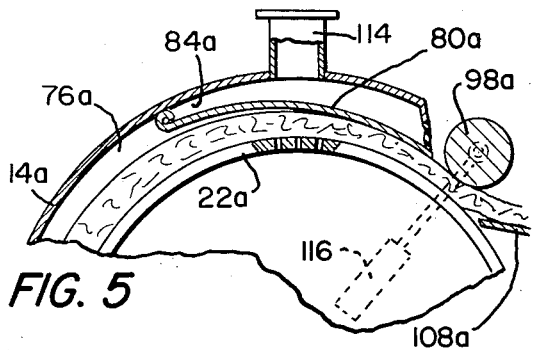
FIGS. 5 through 10 are fragmentary elevational sectional views illustrating apparatus constructed in accordance with modified embodiments of the invention.

FIG. 5, wherein parts similar to those beforedescribed with reference to the apparatus illustrated in FIGS. 1 and 2 are designated by the reference character for the previously described similar part followed by the suffix a, fragmentarily illustrates a washing apparatus which differs from that aforedescribed in that the chamber 84a outside of the baffle 80a is fluid separate from the immediately preceding chamber 76a and a separate inlet connection 114 communicates with the chamber 84a for supplying pressurized water or other liquid thereto. Also, as shown in FIG. 5, the press roll 98a is biased towards the filter medium 22a by a fluid pressure operated actuator 116.

Figure 6:
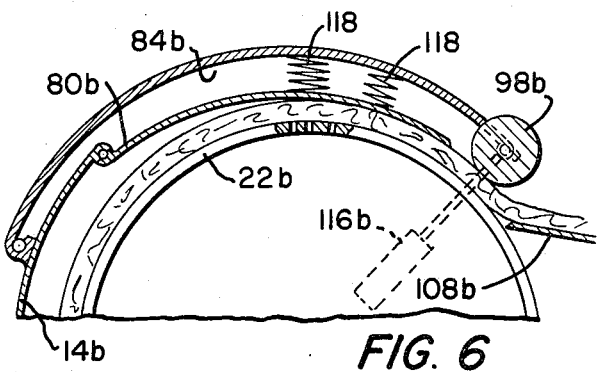

FIG. 6, wherein parts similar to those aforedescribed are designated by the reference character for the aforedescribed similar part followed by the suffix b, fragmentarily illustrates another modified apparatus in which the baffle 80b, rather than being resiliently biased by pressurized fluid towards the filter medium 22b, is resiliently biased by spring 118 theretowards.

Figure 7:
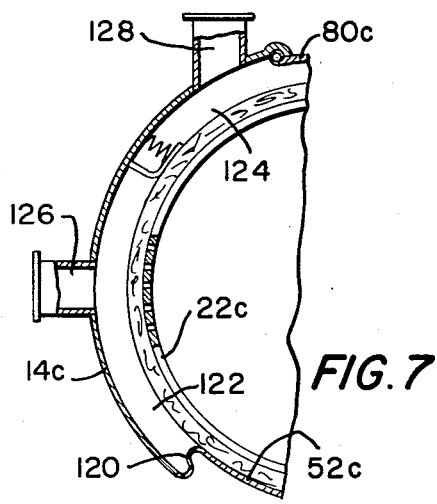

FIG. 7, wherein parts similar to those aforedescribed are designated by the reference character for the aforedescribed similar part followed by the suffix c, fragmentarily illustrates a modified apparatus in which the trailing end of the baffle 52c is mounted by a flexible and resilient sealing element 120; and the arcuate space between the adjacent ends of the baffles 52c, 80c is divided into a pair of washing chambers 122, 124 provided with separate inlet connections 126, 128 through which two different pressurized liquids are supplied for washing or otherwise treating the fibrous material carried by the filter medium 22c.

Figure 8:
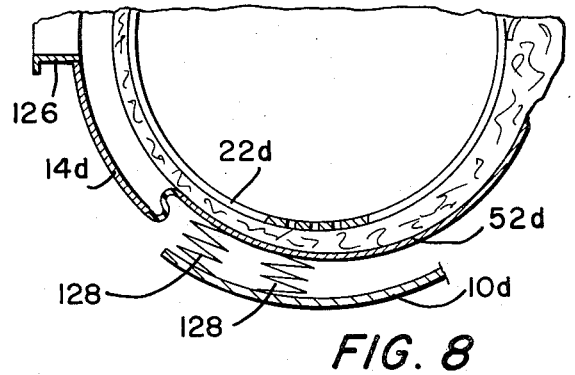

FIG. 8, wherein parts similar to those aforedescribed are designated by the reference character for the aforedescribed similar part followed by the suffix d, fragmentarily illustrates another modified apparatus wherein the baffle 52d is resiliently biased towards the filter medium 22d by springs 128.

Figure 9:
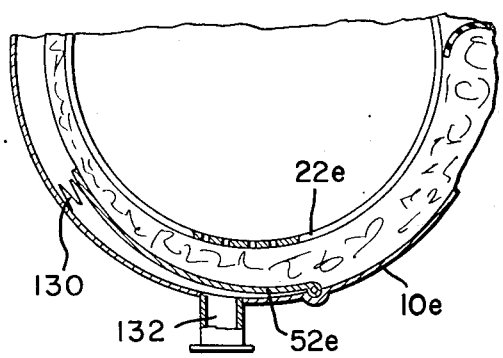

FIG. 9, wherein parts similar to those aforedescribed are designated by the reference character for the aforedescribed similar part followed by the suffix e, fragmentarily illustrates a modified apparatus wherein the baffle 52e is resiliently biased towards the filter medium 22e by both a spring 130 and pressurized water or other liquid supplied through an inlet connection 132.

Figure 10:
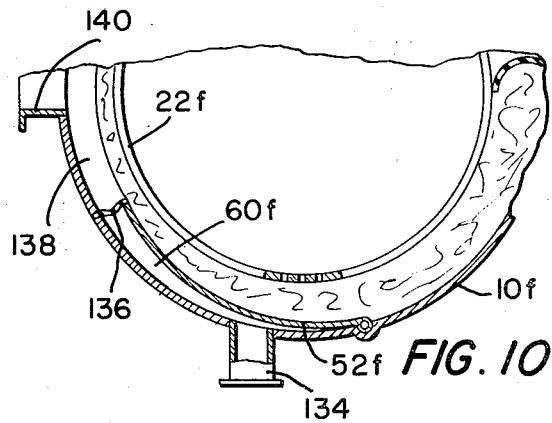

FIG. 10, wherein parts similar to those aforedescribed are designated by the reference character for the aforedescribed similar part followed by the suffix f, fragmentarily illustrates an apparatus wherein the baffle 52f is resiliently biased by pressurized fluid supplied to the chamber 60f through an inlet connection 134; and a flexible and resilient sealing element 136 separate from the baffle 52f separates the chamber 60f from the following chamber 138 whereby a pressurized washing fluid may be separately supplied to the latter through an inlet connection 140.

It will be understood that, although not illustrated, the apparatus of any of the beforedescribed embodiments could be oprated as a thickener for pressurized suspensions containing fibrous material, rather than as a washer, in which event the first baffle, 52, 52c, 52e and 52f could be eliminated. Moreover, as will also be understood, the modifications of FIGS. 5 through 10 could be employed in combination with one another as well as individually in the apparatus illustrated in FIGS. 1 and 2; and, if desired, the hereinbeforedescribed baffles could be resiliently biased towards the filter medium by means such as fluid operated actuators rather than the illustrated arrangements.

FIG. 11 illustrates an embodiment of the invention in the form of a washing press including a pair of generally annular drums or press rolls 142, 144 which are mounted for rotation about parallel axes and enclosed within a pressurized vat or tank 146. The drums 142, 144 include circumferential porous walls or filter mediums 148 spaced by a therebetween nip 150 and contain the usual axial liquid or filtrate discharge channels communicating the openings in the filter mediums 148 with filtrate discharge conduits at the opposite ends of the drums 142, 144. The drums 142, 144 are provided with individual doctor blades 152 which remove pressed solid material from the filter mediums 148; and a discharge conduit 154 is open to the vat 146 throughout the length of the latter to receive the pressed solid material therefrom, the discharge conduit 154 containing a conventional discharge screw 156 rotatably driven in the rotary direction schematically depicted by the arrow shown thereon to shred the solid material and convey the latter from the press.

The drums 142, 144 are provided with showers 158 for discharging cleaning liquid onto the filter mediums 148 after the solid material is removed therefrom by the doctor blades 152; and leakage around the ends of the drums 142, 144 is prevented by suitable, conventional sealing means (not shown). During the operation of the FIG. 11 press, the drums 142, 144 are continuously rotatably driven in the opposite rotary directions schematically depicted by the arrows shown thereon and, as described in U.S. Pat. Application Ser. No. 155,441, filed June 22, 1971, now U.S. Pat. No. 3,730,079, and assigned to the assignee of the present invention, one of the drums 142, 144 may be permitted to laterally move relative to the other thereof to vary the cross section of the nip 150 while the axes of the drums 142, 144 are maintained parallel.

The press includes inlet means adapted to supply a pressuized liquid suspension containing fibrous material to the filter medium 148 of each of the drums 142, 144 in the rotary direction of the drive rotation of the drum. More specifically, for each drum 142, 144 the press includes a supply pipe 160 which communicates with a pressuized source of the liquid suspension and is arranged to introduce the suspension into the vat 146 adjacent to the upper end of the drum 142 or 144. Also, adjacent each supply pipe 160 there is provided a resilient sealing strip 162 which engages the filter medium 148 of the adjacent drum 142 or 144 throughout the length of the latter and prevents the suspension introduced by the supply pipe 160 from flowing around the drum 142, 144 in the rotary direction opposite to that of the driven rotation of the drum.

Immediately following the connection of each of the supply pipes 160 to the vat 146, an imperforate arcuate baffle 164, transversely the length of the vat 146, is rigidly mounted on the vat wall 168 spaced from the filter meidum 148 of the thereadjacent drum 142 or 144 by an arcuate chamber 166 in communication with the supply pipe 160. An imperforate, pressing baffle 170, transversely the full length of the filter mediums 148, arcuately extends along the outer circumference of each filter medium 148 following the trailing end of the thereadjacent baffle 164. Each pressing baffle 170 is preferably of an arcuate length greater than about 60° and less than about 120° of the circumference of the thereadjacent drum 142, 144; and the total of the arcuate lengths of each set of the baffles 164, 170 is preferably greater than about 100° and less than about 180° of such drum circumference.

Each baffle 170 is pivotally mounted at its leading end for movement towards-and-away from its respective filter medium 148 on a mounting block 172, and each baffle 170 throughout its length divides the vat interior into inner and outer arcuate chambers 174, 176, respectively. Each inner chamber 174 is open to communicate with the space 164 preceeding it in the rotary direction of the driven rotation of the thereadjacent drum 142, 144 and is bounded along its outer circumference by the inner side face of a baffle 170 and along its inner circumference by the filter medium 148 of such drum. Each outer or biasing chamber 176 is defined along its outer circumference by the vat wall 168 and along its inner circumference by the outer side face of a baffle 170. The outer side face of each baffle 170 rigidly carries a plurality of laterally spaced, reinforcing rib elements 178 which extend throughout the major portion of the arcuate length of the baffle 170 but terminate short of the trailing end thereof to permit the trailing end portion 180 of each baffle 170 to be freely flexible. The inner side face of each baffle 170 is, as shown in FIG. 11, generally concave and at least adjacent the baffle trailing end, is provided with a coating of a low-coefficient of friction material such as polytetrafluoroethylene or TFE. The opposite side edges of ech baffle 170 are slightly spaced from the vat end walls, and suitable resilient sealing means (not shown)

are provided between each of such side edges and the theradjacent vat end wall to prevent flow of suspension around the side edges of the baffles 170.

A plurality of pressure fluid operated actuators 182 are connected to each baffle 170 at locations laterally spaced thereacross adjacent the baffle trailing end for urging the baffle 170 towards its respective one of the drums 140, 142. The actuators 182 could, of course, be employed to resiliently bias the baffles 170 towards the filter mediums 148 throughout th operation of the press, but are intended only for initially raising the baffles 170 towards the filter mediums 148 following each start-up of the press. Adjacent the leading end of each baffle 170, there is provided an inlet connection 184 which communicates with a pressurized source of a liquid, such as water, and is arranged to supply the liquid to the chamber 176 located outwardly of the baffle 170. The pressurized liquid supplied through the inlet connections 184, is employed as the means for resiliently biasing the baffles 170 towards the filter mediums 148 during the normal operation of the press and causes each baffle 170 to gradually converge towards the filter medium 148 of the adjacent drum 142, 144 in the rotary direction of the driven rotation of the latter. Also, as will be noted, the trailing ends of the chambers 176 are open to communication with the portions of the filter mediums 148 following the trailing ends of the baffles 170, thereby permitting the liquid to further serve to wash the collected solid material on the filter mediums 148 after such is rotated beyond the trailing ends of the baffles 170.

As illustrated, each drum 142, 144 may, if desired, be provided with an arcuate pressing baffle 186 which extends the full length of the drum filter medium 148 and is located intermediate the trailing end of the baffle 170 and the nip 150. The pressing baffles 186 moreover, as shown in FIG. 11, may be mounted on a common support 188 which is biased towards the nip 150 by a plurality of pressure fluid operated actuators 190.

During the operation of the press, the drums 142, 144 are continuously rotatably driven in the opposite rotary directions indicated by the arrows shown thereon in FIG. 11; and pressurized liquid supplied through the inlet connections 184 resiliently biases the baffles 170, previously raised by the actuators 190, to cause the latter to each gradually converge towards the theradjacent drum 142, 144 in the rotary direction of the drum driven rotation.

Pressurized liquid suspension containing fibrous material is continuously supplied to the vat 140 through the supply pipes 160 and flows through the communicating chambers 166, 174 along each drum 142, 144 in the rotary direction of the drum driven rotation. During the passage of the liquid suspension through the chambers 166, the suspension pressure causes liquid to flow inwardly through the filter mediums 148, thereby resulting in the commencement of mats or coverings of fibrous material on the filter mediums 148. During the passage of the suspension through the chambers 174, the gradual narrowing of such chambers 174 causes substantial additional liquid to flow from the suspension through the filter mediums 148.

The fibrous material thus collected on the filter mediums 148 is moved by the rotation of the drums 142, 144 beyond the trailing ends of the baffles 170 and is first washed by the biasing liquid flowing from the chambers 176, then pressed by the baffles 186 and again pressed in the nip 150 where each of the drums 142, 144 in effect serves as a press roll for the other. Then the material is removed from the drums 142, 144 by the doctor blades 152 and discharged from the press by the screw 156.

From the preceeding description it will be seen that the invention provides new and improved apparatus particularly constructed and arranged for accomplishing the aforesaid objectives and advantages. It will, moreover, be seen that the invention also provides a method for processing a suspension containing fibrous material on a filter medium circumferentially carried by a drum rotatably driven in a predetermined rotary direction, which method may comprise the steps of supplying a pressurized suspension to one side of the filter medium in the rotary direction of the driven drum rotation, forming a mat of the fibrous material on the filter medium by an arcuate baffle resiliently biased to gradually converge towards the filter medium in the rotary direction of the drum driven rotation and having low friction material on its surface opposing the filter medium, washing the collected mat of fibrous material either by fluid employed for resiliently biasing the aforementioned baffle or by separately supplied fluid, and, if desired, compacting the washed mat of fibrous material by a second arcuate baffle resiliently biased towards the filter medium and gradually converging theretowards in the rotary direction of the drum driven rotation and also by a closely thereafter press roll prior to removal of the mat from the filter medium.

It will be understood that, although only a few embodiments of the invention have been illustrated and hereinbefore specifically described, the invention is not limited merely to these embodiments, but rather contemplates other embodiments and variations within the scope of the following claims.

We claim:

1. In an apparatus for processing a suspension containing fibrous material, a drum adapted to be rotatably driven in a predetermined rotary direction andhaving a circumferential porous filter medium for collecting fibrous material, discharge means for removing collected fibrous material from said filter medium, a pressing baffle extending along one side of said filter medium for a substantial portion of the drum circumference and spaced around said drum from said discharge means, said pressing baffle having a leading end leading in said predetermined rotary direction and a trailing end trailing said predetermined rotary direction, said pressing baffle having a face opposing said one side of said filter medium spaced therefrom to bound a space arcuately along said side of said filter medium for a substantial portion of the drum circumference, said pressing baffle being pivotally mounted adjacent its said leading end for movement towards-and-away from said filter medium and the major portion of the length of said pressing baffle circumferentially of said drum being restrained from flexing, said pressing baffle being adapted to gradually converge towards said one side of said filter medium in said predetermined rotary direction such that said space gradually narrows in said predetermined rotary direction for causing substantial liquid flow from said space through said filter medium, means for causing said pressing baffle to be resiliently biased to so gradually converge towards said filter medium in said predetermined rotary direction, means for supplying pressurized washing fluid to said one side of said filter medium following said trailing end of said pressing baffle and before said discharge means in said predetermined rotary direction whereby, during an arcuate portion of the drum rotation intermediate said baffle trailing end and said discharge means, fibrous material collected on said filter medium is washed by such washing fluid, and inlet means for supplying pressurized suspension containing fibrous material to said one side of said filter medium, said inlet means and said discharge means being operatively associated with said filter medium on opposite sides of said pressing baffle in said predetermined rotary direction.

2. An apparatus according to claim 1, wherein said pressing baffle includes a flexible portion adjacent its said trailing end.

3. An apparatus according to claim 1, wherein said one side of said filter medium is the outer side thereof.

4. An apparatus according to claim 1, wherein said face of said pressing baffle is, at least adjacent said trailing end of said pressing baffle, provided with low-coefficient of friction material.

5. An apparatus according to claim 1, wherein said pressing baffle extends along said one side of said filter medium for an arcuate distance greater than about 60° and less than about 120° of the drum circumference.

6. An apparatus according to claim 1, further comprising stationary baffle means extending along said one side of said filter medium spaced therefrom and substantially immediately preceeding said pressing baffle in said predetermined rotary direction.

7. An apparatus according to claim 6, wherein said pressing baffle and said stationary baffle means together extend along said one side of said filter medium for an arcuate distance greater than about 100° and less than about 180° of the drum circumference.

8. An apparatus according to claim 1, wherein said bias causing means comprises a biasing chamber on the opposite side of said pressing baffle from said filter medium, and means for supplying pressurized fluid to said biasing chamber whereby the pressurized fluid biases said pressing baffle towards said filter medium.

9. An apparatus according to claim 8, wherein said washing fluid supplying means comprises means for supplying pressurized fluid from said biasing chamber to said one side of said filter medium following said trailing end of said pressing baffle.

10. An apparatus according to claim 8, wherein said washing fluid supplying means comprises means for supplying washing fluid independently of said biasing chamber.

11. An apparatus according to claim 8, wherein said biasing fluid supplying means is connected to said biasing chamber adjacent said leading end of said pressing baffle.

12. An apparatus according to claim 1, wherein said pressing baffle includes a flexible portion adjacent its said trailing end, and at least the major part of the remainder of the length of said pressing baffle circumferentially of said drum is provided with reinforcing rib means.

13. An apparatus according to claim 1, wherein said face of said pressing baffle is at least generally concave, said one side of said filter medium is the outer side thereof, said pressing baffle includes a flexible portion adjacent its said trailing end, said bias causing means comprises a biasing chamber on the opposite side of said pressing baffle from said filter medium and means for supplying pressurized fluid to said biasing chamber whereby the pressurized fluid biases said pressing baffle towards said filter medium.

14. An apparatus according to claim 13, wherein said washing fluid supplying means comprises means for supplying pressurized fluid from said biasing chamber to said one side of said filter medium following said trailing end of said pressing baffle.

15. An apparatus according to claim 13, wherein said biasing fluid supplying means is connected to said biasing chamber adjacent said leading end of said pressing baffle.

16. An apparatus according to claim 13, wherein said face of said pressing baffle is, at lesat adjacent said trailing end of said pressing baffle, provided with low-coefficient of friction material.

17. An apparatus according to claim 13, wherein said pressing baffle extends along said one side of said filter medium for an arcuate distance greater than about 60° and less than about 120° of the drum circumference.

18. An apparatus according to claim 13, further comprising stationary baffle means extending alon said one side of said filter medium spaced therefrom and substantially immediately preceeding said pressing baffle in said predetermined rotary direction.

19. An apparatus according to claim 18, wherein said pressing baffle and said stationary baffle means together extend along said one side of filter medium for an arcuate distance greater than about 100° and less than about 180° of the drum circumference.

20. An apparatus according to claim 13, wherein the major part of the length of said pressing baffle circumferentially of said drum is provided with a plurality of reinforcing ribs.

21. An apparatus according to claim 1, further comprising a second pressing baffle extending along said one side of said filter medium intermediate said trailing end of said pressing baffle and said discharge means, said second pressing baffle having a face opposing said one side of said filter medium spaced therefrom to bound a space arcuately along said one side of said filter medium, said second pressing baffle being movable towards-and-away from said filter medium and adapted to gradually converge towards said one side of said filter medium in said predetermined rotary direction to cause said space between said second pressing baffle and said one side of said filter medium to gradually narrow in said predetermined rotary direction, and means for causing said second pressing baffle to be resiliently biased to so gradually converge towards said predetermined rotary direction.

22. An apparatus according to claim 21, wherein the bias causing means for said second pressing baffle comprises means defining a second biasing chamber on the opposite side of said second pressing baffle from said filter medium, and means for supplying pressurized fluid to such second biasing chamber whereby the presurized fluid resiliently causes said second pressing baffle to gradually converge towards said filter medium in said predetermined rotary direction.

23. An apparatus according to claim 21, further comprising a press roll adjacent said one side of said filter medium closely spaced after said second pressing baffle in said predetermined rotary direction and intermediate said second pressing baffle and said discharge means.

24. An apparatus according to claim 21, further comprising motor means for biasing from said filter medium the end portion of said second pressing baffle trailing in said predetermined rotary direction.

25. In an apparatus for processing a suspension containing fibrous material, a first drum adapted to be rotatably driven in a first predetermined rotary direction and having a first circumferential porous filter medium for collecting fibrous material, a second drum adapted to be rotatably driven in a second predetermined rotary direction opposite to said first predetermined rotary direction and having a second circumferential porous filter medium for collecting fibrous material, said drums being circumferentially spaced apart by a therebetween nip, discharge means for removing collected fibrous material from each of said filter mediums, a first pressing baffle extending along the outer side of said first filter medium for a substantial portion of the circumference of said first drum and spaced around said first drum from the said discharge means for said first filter medium, a second pressing baffle extending along the outer side of said second filter medium for a substantial portion of the circumference of said second drum and spaced around said second drum from the said discharge means for said second filter medium, each of said pressing baffles having a leading end leading in the predetermined rotary direction of the rotation of its respective corresponding said drum and a trailing end trailing in such predetermined rotary direction, siad nip being intermediate said trailing ends of said pressing baffles and said discharge means, each of said pressing baffles having a face opposing the outer side of its respective corresponding said filter medium spaced therefrom to bound a space arcuately along such outer side of such filter medium for a substantial portion of the circumference of the respective corresponding said drum, each of said pressing baffles being pivotally mounted adjacent its leading end for movement towards-and-away from its respective corresponding said filter medium and including a substantial portion adjacent its said leading end restrained from flexing, each of said pressing baffles being adapted to gradually convege towards the outer side of its respective corresponding said filter medium in the predetermined rotary direction of the rotation of the corresponding said drum such that each of said space gradually narrows in the predetermined rotary direction of the rotation of the said drum for causing substantial liquid flow from said spaces through said filter mediums, means for causing each of said pressing baffles to be resiliently biased to so gradually converge towards its respective corresponding said filter medium in the predetermined rotary direction of the rotation of the corresponding said drum, means for supplying pressurized washing fluid to the outer side of each of said filter mediums following the trailing end of the respective corresponding said pressing baffle and before said nip in the predetermined rotary direction of the rotation of the drum whereby, during an arcuate portion of the rotation of each said drum intermediate the trailing end of its respective said pressing baffle and said nip, fibrous material collected on the filter medium of the drum is washed by such washing fluid, and inlet means for supplying pressurized suspension containing fibrous material to said outer sides of said filter medium, said inlet means comprising means for supplying the pressurized suspension to each said filter medium following the said discharge means for the filter medium and before the said leading end of the corresponding said pressing baffle in the predetermined rotary direction of the rotation of the drum.

26. An apparatus according to claim 25, further comprising pressinb baffle means intermediate said nip and each of said pressing baffles.

27. An apparatus according to claim 25, wherein each of said pressing baffles extends along the corresponding drum for an arcuate distance greater than about 60° and less than about 120° of the drum circumference.

28. An apparatus according to claim 25, further comprising first stationary baffle means extending along said first drum spaced therefrom and substantially immediately preceeding said first pressing baffle in said first predetermined rotary direction, and second stationary baffle means extending along said second drum spaced therefrom and substantially immediately preceeding said second pressing baffle in said second predetermined rotary direction.

29. An apparatus according to claim 28, wherein said first stationary baffle means and said first pressing baffle together extend along said first drum for an arcuate distance greater than about 100° and less than about 180° of the circumference of said first drum, and said second stationary baffle means and said second pressing baffle together extend along said second drum for an arcuate distance greater than about 100° and less than about 180° of the circumference of the latter.

30. An apparatus according to claim 28, further comprising pressing baffle means intermediate the trailing end of each said pressing baffle and said nip for pressing fibrous material on said filter mediums.

31. An apparatus according to claim 30, wherein said pressing baffle means comprises individual baffles for said drums, and further comprising means for biasing such baffles towards their respective drums.

32. An apparatus according to claim 25, wherein each said pressing baffle includes a flexible portion adjacent its said trailing end.

33. An apparatus according to claim 25, wherein the major portion of the length of each said pressing baffle circumferentially of its respective said drum is restrained from flexing, and each said pressing baffle includes a freely flexible portion adjacent its trailing end.

34. An apparatus according to claim 25, wherein said inlet means is arranged to supply the pressurized suspension whereby the suspension passes along each said filter medium in the predetermined rotary direction of the driven rotation of the respective drum.

35. An apparatus according to claim 25, wherein said face of each said pressing baffle is, at least adjacent the baffle trailing end, provided with low-coefficient of friction material.

36. An apparatus according to claim 35, wherein each said pressing baffle extends along its repsective said filter medium for an arcuate distance greater than about 60° and less than about 120° of the circumference of the respective drum.

37. An apparatus according to claim 36, further comprising stationary baffle means extending along the outer side of each said filter medium spaced therefrom and immediately preceeding the respective said pressing baffle in the predetermined rotary direction of the driven rotation of the corresponding drum.

38. An apparatus according to claim 37, wherein each said pressing baffle and its respective said stationary baffle means together extend along said one side of the filter medium for an arcuate distance greater than about 100° and less than about 180° of the circumference of the corresponding drum.

39. An apparatus according to claim 25, wherein said bias causing means for each said pressing baffle comprises a biasing chamber on the opposite side of the pressing baffle from said filter medium, and means for supplying pressurized fluid to said biasing chamber whereby the pressurized fluid biases the pressing baffle towards said filter medium.

40. An apparatus according to claim 39, wherein each said washing fluid supplying means comprises means for supplying pressurized fluid from one of said biasing chambers.

41. An apparatus according to claim 25, further comprising actuator means for moving each said pressing baffle towards the corresponding filter medium.

42. A method for processing a pressurized suspension containing fibrous material on a porous filter medium circumferentially carried by a drum rotatably driven in a predetermined rotary direction, comprising the steps of providing along one side of said filter medium a space gradually narrowing in said predetermined rotary direction for a substantial portion of the drum circumference and bounded by a pressing baffle having the major portion of its length circumferentially of said drum restrained from flexing, resiliently biasing said prssing baffle to gradually converge towards said one side of said filter medium for a substantial portion of the drum circumference to cause substantial liquid flow from said space through said filter medium, supplying the suspension to said one side of said filter medium prior to the end of said baffle leading in said predetermined rotary direction, causing the supplied suspension to pass along said one side of said filter medium in said predetermined rotary direction whereby liquid may flow from the suspension through said filter medium, washing the fibrous material collected on said filter medium with pressurized fluid after the end of said baffle trailing in said predetermined rotary direction, and removing the washed fibrous material from said filter medium.

43. A method according to claim 42, further comprising the step of pressing the fibrous material collected on said filter medium after its said washing.

44. A method according to claim 42, wherein said pressing baffle is so resiliently biased by pressurized liquid, and further comprising the step of employing such pressurized biasing liquid for said washing of the collected fibrous material.

45. A method according to claim 42, further comprising the step of pressing the fibrous material collected on said filter medium by another said drum after its said washing.

46. A method according to claim 45, wherein said pressing baffle is so resiliently biased by pressurized liquid, and further comprising the step of employing such pressurized biasing liquid for said washing of the collected fibrous material.

* * * * *